(12) United States Patent
Lieberman et al.

(10) Patent No.: US 11,240,268 B1
(45) Date of Patent: Feb. 1, 2022

(54) DYNAMIC HONEYPOTS FOR COMPUTER PROGRAM EXECUTION ENVIRONMENTS

(71) Applicant: EMC IP Holding Company LLC, Hopkinton, MA (US)

(72) Inventors: Amit Lieberman, Raanana (IL); Assaf Natanzon, Tel Aviv (IL); Oron Golan, Meitar (IL); Raul Shnier, Ruhama (IL)

( * ) Notice: Subject to any disclaimer, the term of this patent is extended or adjusted under 35 U.S.C. 154(b) by 231 days.

(21) Appl. No.: 15/716,836

(22) Filed: Sep. 27, 2017

(51) Int. Cl.
| | | |
|---|---|---|
| H04L 29/06 | (2006.01) | |
| G06F 21/55 | (2013.01) | |
| G06F 21/53 | (2013.01) | |
| G06F 21/57 | (2013.01) | |

(52) U.S. Cl.
CPC .......... *H04L 63/1491* (2013.01); *G06F 21/53* (2013.01); *G06F 21/554* (2013.01); *H04L 63/10* (2013.01); *G06F 21/57* (2013.01); *H04L 63/20* (2013.01)

(58) Field of Classification Search
CPC ..... H04L 63/1491; H04L 63/20; H04L 63/10; G06F 21/53; G06F 21/554; G06F 21/57; G06F 8/52
USPC ...................... 726/23, 24; 713/201
See application file for complete search history.

(56) References Cited

U.S. PATENT DOCUMENTS

| | | | | |
|---|---|---|---|---|
| 5,774,728 A | * | 6/1998 | Breslau ...................... | G06F 8/47 717/141 |
| 8,181,250 B2 | * | 5/2012 | Rafalovich ......... | H04L 43/0876 726/23 |
| 8,667,582 B2 | * | 3/2014 | Thomas .............. | H04L 63/0227 726/22 |
| 9,936,008 B2 | * | 4/2018 | Elias .................. | H04L 67/1023 |
| 9,954,870 B2 | * | 4/2018 | Boss ................... | H04L 63/1416 |
| 9,973,530 B2 | * | 5/2018 | Hobe ................. | H04L 65/1069 |
| 10,333,951 B1 | * | 6/2019 | Natanzon ............ | H04L 63/1408 |
| 10,574,697 B1 | * | 2/2020 | McClintock ........ | H04L 63/1491 |
| 10,791,144 B1 | * | 9/2020 | Golan ................. | H04L 63/1425 |
| 2004/0128543 A1 | * | 7/2004 | Blake .................. | H04L 63/1433 726/25 |
| 2005/0166072 A1 | * | 7/2005 | Converse ............ | H04L 63/1441 726/5 |

(Continued)

OTHER PUBLICATIONS

Daniel Fraunholz, et al., An adaptive honeypot configuration, deployment and maintenance strategy, Feb. 2017, 2017 19th International Conference on Advanced Communication Technology (ICACT), IEEE Xplore, pp. 53-57.*

Daniel Fraunholz; et al., An adaptive honeypot configuration, deployment and maintenance strategy, Feb. 9-22, 2017, 2017 19th International Conference on Advanced Communication Technology (ICACT), pp. 53-57.*

(Continued)

*Primary Examiner* — Jeffery L Williams
(74) *Attorney, Agent, or Firm* — Dergosits & Noah LLP; Todd A. Noah (57) ABSTRACT

Dynamic honeypots for computer program execution environments are described. A determination is made whether a time period has expired since a computer program execution environment, of multiple computer program execution environments, began executing a computer program that provides a user service. The computer program execution environment is changed into a computer security mechanism that counteracts an attempt of unauthorized use of a system that comprises the computer program execution environment, in response to a determination that the time period has expired since the computer program execution environment began executing the computer program that provides the user service.

20 Claims, 4 Drawing Sheets

(56) References Cited

U.S. PATENT DOCUMENTS

| | | | | |
|---|---|---|---|---|
| 2006/0059473 | A1* | 3/2006 | Moler | G06F 8/45 |
| | | | | 717/149 |
| 2007/0157316 | A1* | 7/2007 | Devereux | H04L 63/0227 |
| | | | | 726/24 |
| 2009/0307781 | A1* | 12/2009 | Iga | G06F 21/53 |
| | | | | 726/27 |
| 2011/0307951 | A1* | 12/2011 | Yermakov | G06F 21/56 |
| | | | | 726/12 |
| 2013/0160079 | A1* | 6/2013 | Hebert | H04L 63/145 |
| | | | | 726/3 |
| 2017/0039049 | A1* | 2/2017 | Eltsin | G06F 8/52 |
| 2018/0159701 | A1* | 6/2018 | Krause | H04L 61/2514 |
| 2019/0020683 | A1* | 1/2019 | Haerterich | H04L 63/1491 |
| 2019/0108336 | A1* | 4/2019 | Gurkok | G06F 21/562 |

OTHER PUBLICATIONS (Sherif Khattab, et al., Honeypot Back-propagation for Mitigating Spoofing Distributed Denial-of-Service Attacks, Apr. 25-29, 2006, Proceedings 20th IEEE International Parallel & Distributed Processing Symposium, pp. 1-8, hereinafter Khattab).*

S. M. Khattab, C. Sangpachatanaruk, D. Mosse, R. Melhem and T. Znati, "Roaming honeypots for mitigating service-level denial-of-service attacks," 24th International Conference on Distributed Computing Systems, 2004. Proceedings., Tokyo, Japan, 2004, pp. 328-337, doi: 10.1109/ICDCS.2004.1281598. (Year: 2004).*

Selvaraj et al., "Ant-based distributed denial of service ddetection technique using roaming virtual honeypots", IET Journals, 2016, p. 929-935. (Year: 2016).*

* cited by examiner

DYNAMIC HONEYPOTS FOR COMPUTER PROGRAM EXECUTION ENVIRONMENTS

BACKGROUND

Computer security, also known as cyber-security or Information Technology (IT) security, is the protection of computer systems from the theft or damage to their hardware, software or information, as well as from disruption or misdirection of the services that the computer systems provide. Computer security includes controlling physical access to the hardware, as well as protecting against harm that may come via network access, data injection, and code injection.

A computer security mechanism in a computer system can be referred to as a "honeypot," and can be set to detect, deflect, or, in some manner, counteract attempts at unauthorized use of a computer system, such as by generating a report about an attack for a system administrator and suggesting that the system administrator change a firewall rule. A honeypot can include data that appears to be a legitimate part of a network site, thereby attracting an attacker, but is actually isolated and monitored. Since a honeypot seems to contain information or a resource of value to an attacker, the attacker is blocked from unauthorized use of the network site while accessing the honeypot.

A virtual machine can be an emulation of a computer system. Virtual machines are based on computer architectures and provide functionality of a physical computer. The virtual machine implementations may involve specialized hardware, software, or a combination. A system virtual machine provides a substitute for a physical computer and the functionality needed to execute an entire operating system, for which a hypervisor uses native execution to share and manage hardware, allowing for multiple environments which are isolated from one another, yet exist on the same physical computer. A process virtual machine is designed to execute computer programs in a platform-independent environment. Some virtual machines are designed to also emulate different architectures and allow execution of software applications and operating systems written for another central processing unit or architecture.

Operating-system-level virtualization enables the resources of a computer to be partitioned via the kernel's support for multiple isolated user space instances, which can be called software containers, and may appear to be physical machines to the end users. Therefore, a software container can be an isolated computer program execution environment enabled by a computer's operating system. An application program, or application, executing on an ordinary, computer's operating system can identify all of that ordinary computer's resources, such as connected devices, files and folders, network shares, central processing unit (CPU) power, and quantifiable hardware capabilities. However, an application executing inside a software container can only identify the software container's contents and the devices that are assigned to the software container. A software container can wrap an executing application in a complete environment containing everything that the application needs, such as memory, disk space, network access, and an operating system. A software container is lightweight, portable, and stateless, which means that one of many containers that are executing a multi-processor application may be terminated without effecting the behavior of the application executing in the other software containers.

A computer system can include a storage array, which can be a disk storage system that contains multiple disk drives. Unlike a disk enclosure, a storage array can have cache memory and advanced functionality, such as virtualization and Redundant Array of Independent Disks (RAID).

DETAILED DESCRIPTION

The static nature of a computer network can enable an attacker to study and eventually identify any honeypots in the network. Identification of any honeypots can enable an attacker to maintain unauthorized access privileges for extended periods of time while attacking a computer network.

Embodiments herein provide dynamic honeypots for computer program execution environments. A determination is made whether a time period has expired since a computer program execution environment, of multiple computer program execution environments, began executing a computer program that provides a user service. If the time period has expired since the computer program execution environment began executing the computer program that provides the user service, the computer program execution environment is changed into a computer security mechanism that counteracts an attempt of unauthorized use of a system that includes the computer program execution environment.

For example, a cyber-security tool determines whether a 10-minute time period has passed since a software container began executing a database application that enables clients to access data stored in a storage array. If the 10-minute time period has passed, the cyber-security tool changes the software container into a honeypot that monitors any incoming network communications, which enables the honeypot to identify any current attacks, and possibly identify the attacker. If an attacker has spent time and effort identifying where active software containers and honeypots are located in a computer network, changing one of the active software containers into a honeypot can trick an attacker into attacking the software container that was changed into the honeypot, thereby protecting the computer network from the attack.

Figure 1:
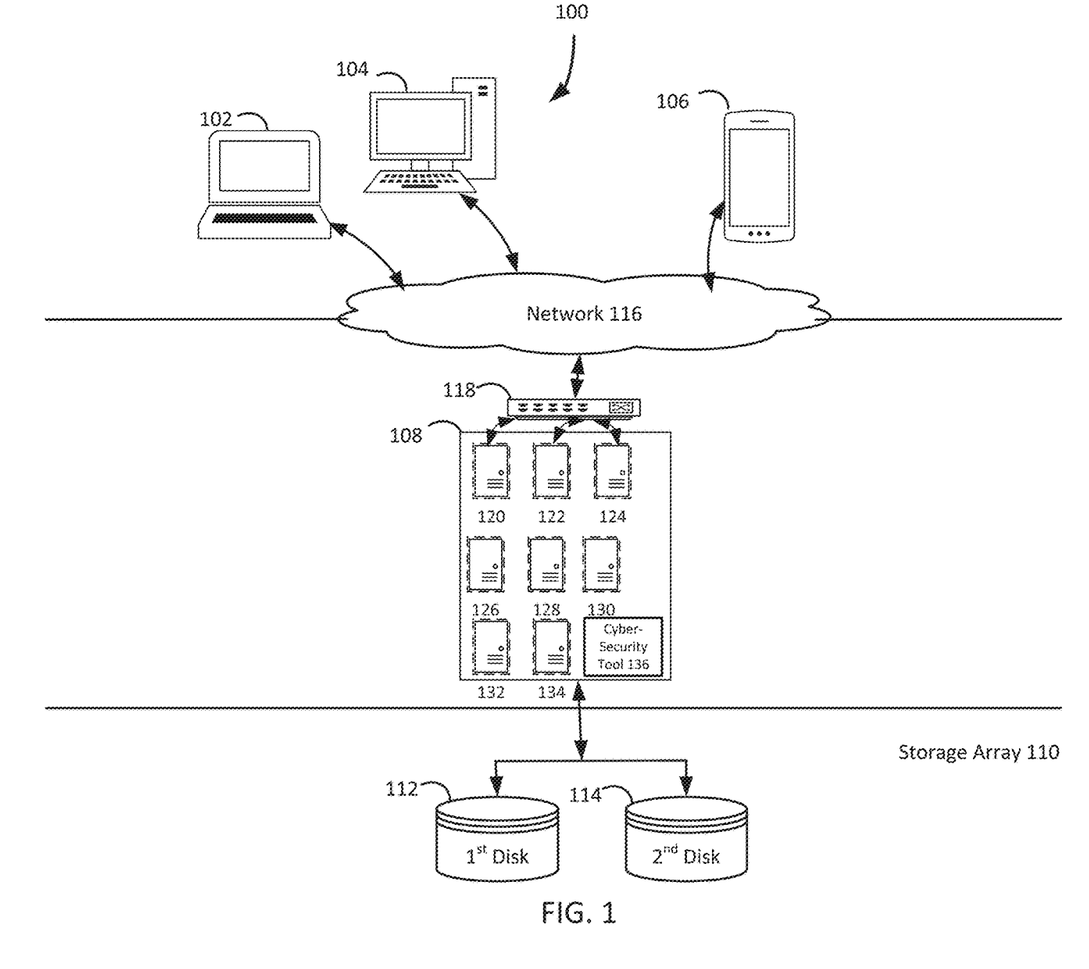
FIG. 1 illustrates a block diagram of an example system for dynamic honeypots for computer program execution environments, under an embodiment.

FIG. 1 illustrates a diagram of a system for dynamic honeypots for computer program execution environments, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as the laptop computer 102, the second client 104 as the personal computer 104, and the third client 106 as the smartphone 106, each of the clients 102-106 may be any type of computer, such as a server. The storage array 110 includes a first disk 112 and a second disk 114. While FIG. 1 depicts the storage array 110 as including the disks 112-114, the disks 112-114 may be any type of storage devices. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 400 depicted in FIG. 4 and described below.

The system 100 can also include a load balancer 118, a first computer program execution environment 120, a second computer program execution environment 122, a third computer program execution environment 124, a fourth computer program execution environment 126, a fifth computer program execution environment 128, a sixth computer program execution environment 130, a seventh computer program execution environment 132, an eighth computer program execution environment 134, and a cyber-security tool 136. The load balancer 118 can distribute data requests, received from the clients 102-106 via the network 116, to the first computer program execution environment 120, the second computer program execution environment 122, and the third computer program execution environment 124. The computer program execution environments 120-124 can execute computer programs that access the data stored in the storage array 110 on behalf of the data requests from the clients 102-106. If the computer program execution environments 120-124 are a first layer of computer program execution environments 120-124, the first layer of computer program execution environments 120-124 can execute computer programs that process the data requests from the clients 102-106 and provide the processed requests to a second layer of computer program execution environment 126-130, which can then execute a computer program to access the data stored in the storage array 110 on behalf of data requests from the clients 102-106. Alternatively, the second layer of computer program execution environment 126-130 can execute a computer program to further process the data requests from the clients 102-106 and provide the further processed data requests to a third layer of computer program execution environment 132-134, which can then execute a computer program to access the data stored in the storage array 110 on behalf of the data requests from the clients 102-106. The layers that include the computer program execution environments 120-134 may include any combination of software containers 120-134, virtual machines 120-134, and/or honeypots 120-134. Although FIG. 1 depicts the system 100 with one load balancer 118, three first layer of computer program execution environments 120-124, three second layer of computer program execution environment 126-130, and two third layer of computer program execution environment 132-134, the system 100 may include any number of load balancers 118, any number of first layer of computer program execution environments 120-124, any number of second layer of computer program execution environments 126-130, any number of third layer of computer program execution environments 132-134, and any number of layers of computer program execution environments. The cyber-security tool 136 may be implemented by any combination of software and/or hardware.

The system 100 can create and deploy environments, such as software containers and/or virtual machines, that execute computer programs which provide services for users, some of whom may be attackers. For example, and without limitation, this can include the cyber-security tool 136 creating the software containers 120-124 from a master software container, and deploying the software containers 120-124 that each execute a corresponding database application which enables the clients 102-106 to access data stored in the storage array 110. A master computer program execution environment may be stored in a secure storage location. The cyber-security tool 136 can run cyber-security tests on the master computer program execution environment to verify that the master computer program execution environment has no known vulnerabilities, verify that every required layer in the master computer program execution environment is installed, verify that the master computer program execution environment is not corrupted by any malicious code, and apply a retention lock which assures that the master computer program execution environment cannot be modified. The cyber-security tool 136 can also verify that a deployed copy that is created from the master computer program execution environment is not a modified version of the master computer program execution environment. Additionally, the cyber-security tool 136 can inspect the infrastructure where the copies of the master computer program execution environment are to be deployed, such as the server 108, for security issues and for file system aspects, such as malware detection. A computer program can be a collection of instructions that performs a specific task when executed by an electronic device for storing and processing data. A computer program execution environment can be the structure within which a collection of instructions performs a specific task when operated by an electronic device for storing and processing data. A user service can be an act of responding to a request by a person who operates an electronic device for storing and processing data.

Having deployed computer program execution environments, the system 100 can determine whether it is time to change a network identifier for a computer program execution environment that is providing a user service. By way of example and without limitation, this can include the cyber-security tool 136 determining whether the 10-minute time period for a network identifier change has passed since the software container 120 began executing the database application that enables the clients 102-106 to access data stored in the storage array 110. If the time period for a network identifier change has expired since the computer program execution environment began executing the computer program that provides the user service, the cyber-security tool 136 can change a network identifier used to access the computer program execution environment into another network identifier used to access the computer program execution environment. In embodiments, this can include the cyber-security tool 136 changing the previous Internet Protocol address for the software container 120 to a new Internet Protocol address for the software container 120. Although this example describes changing a network identifier that is an Internet Protocol address for a computer program execution environment, the cyber-security tool 136 can change a network identifier that is a Media Access Control (MAC) address for a computer program execution environment or the name of the computer program execution environment. Although a network identifier may be stored in hardware by the hardware's manufacturer, the cyber-security tool 136 can change a network identifier for a computer program execution environment such as a software container or a virtual machine because the network identifiers for a software container or a virtual machine may be dynamically assigned to such a computer program execution environment rather than being stored in the corresponding hardware by the hardware's manufacturer. A time period can be a length or portion of existence in the past, present, and/or future, as measured in seconds, minutes, hours, days, weeks, months, and/or years.

Since changing a network identifier for a computer program execution environment proactively changes the location of important system resources and the network's configuration, such a change may be considered part of a moving target defense, which increases uncertainty and apparent complexity for attackers, reduces their windows of opportunity, and increases the costs of their probing and attack efforts. Changing a network identifier for a computer program execution environment results in the mapping of the attacked computer system's network topology becoming more complex, and decreases the amount of time that an attacker has to learn the network topology before the network topology is reconfigured by such a change. After the previous network identifier for a computer program execution environment is changed to the current network identifier for the computer program execution environment, anything that an attacker learned about the previous network identifier becomes useless for the attacker. A network identifier can be a sequence of characters used to refer to an element in a system of interconnected things.

If the time period for a network identifier change has not expired since the computer program execution environment began executing the computer program that provides the user service, the cyber-security tool 136 continues checking until the time period for a network identifier change has expired since the computer program execution environment began executing the computer program that provides the user service. For example, 9 minutes after the software container 120 began executing the database application that enables the clients 102-106 to access data stored in the storage array 110, the cyber-security tool 136 continues checking whether the 10-minute time period for a network identifier change has passed.

A relatively small time period for a network identifier change narrows the exposure window of a computer program execution environment to attacks, which increases the attacker's costs in attacking the system that includes the computer program execution environment, and lowers both an attack's likelihood of success and the attacker's perceived benefit from a successful attack. However, a relatively small time period for a network identifier change can result in high central processing unit usage by the system that includes the computer program execution environment. Therefore, the cyber-security tool 136 may set the time period for a network identifier change to be a little less than the length of access time that may be required by successful attacks.

The time period for a network identifier change may be based on any combination of a default time period, a user configured time period, and a time period based on the historical time required for a successful attack. For example, the cyber-security tool 136 initially sets the time period for a network identifier change to be 10 minutes, which is shorter than the 10.5 minutes historically required for a successful attack. In another example, the cyber-security tool 136 initially sets the time period for a network identifier change to be generated by a random number generator that uses a normal distribution with a mean of 7 minutes and a standard deviation of 1 minute, such that 99.7% of the random numbers generated will be between 4 minutes and 10 minutes, which is shorter than the 10.5 minutes historically required for a successful attack.

The cyber-security tool 136 can dynamically adjust the time period for a network identifier change. For example, 9.5 minutes after the software container 120 was deployed, the cyber-security tool 136 identifies abnormal behavior for the software container 120 based on monitoring the parameters for file systems, ports, environment variables, links, mounts, process numbers, thread numbers, memory consumption, central processor unit usage, and input/output usage relative to corresponding historical baseline values. The cyber-security tool 136 identifies abnormal behavior for a monitored parameter when the parameter is higher than a corresponding historical high baseline value or lower than a corresponding historical low baseline value. The cyber-security tool 136 analyzes the association between parameters with abnormal behavior, and uses discretion to determine whether to identify abnormal behavior for a computer program execution environment, and takes appropriate action based on this determination. For example, in response to detecting abnormal behavior 9.5 minutes after the software container 120 was deployed, the cyber-security tool 136 changes the time period for a network identifier change to 9 minutes, which is shorter than the 9.5 minutes that may be required for a successful attack. The detection of abnormal behavior in the software container 120 can also result in the cyber-security tool 136 immediately changing the software container to the honeypot 120. In another example, in response to detecting abnormal behavior 9.5 minutes after the software container 120 was deployed, the cyber-security tool 136 changes the time period for a network identifier change to be generated by the random number generator that uses a normal distribution with a mean of 6 minutes and a standard deviation of 1 minute, such that 99.7% of the random numbers generated will be between 3 minutes and 9 minutes, which is shorter than the 9.5 minutes that may be required for a successful attack. The cyber-security tool 136 may use a random number generator to generate the time period for a network identifier so that an attacker will not be able to anticipate the amount of time available before the cyber-security tool 136 begins reconfiguring network topology by changing any network identifiers.

After deploying computer program execution environments, the system 100 determines whether a time period to change a computer program execution environment to a computer security mechanism has expired since the computer program execution environment began executing a computer program that provides a user service. For example, and without limitation, this can include the cyber-security tool 136 determining whether a 10-minute time period for changing the software container 120 to the honeypot 120 have passed since the software container 120 began executing the database application that enables the clients 102-106 to access data stored in the storage array 110. If the time period for changing a computer program execution environment into a computer security mechanism creation has expired, the cyber-security tool 136 changes the computer program execution environment into the computer security mechanism. By way of example and without limitation, this can include the cyber-security tool 136 changing the software container 120 into the honeypot 120. Even if an attacker compromised the software container 120, the effect of the unauthorized access lasts only until the software container 120 is changed into the honeypot 120. The honeypot 120 monitors any incoming network communications, which enables the honeypot 120 to identify any current attacks, and possibly identify the attacker. Dynamically changing a computer program execution environment into a computer security mechanism makes identification of the computer security mechanism more difficult for an attacker. Even if the attacker can identify simulated network communication injected into the computer security mechanism, the computer security mechanism was an active computer program execution environment that processed network communications that were not simulated. Therefore, the attacker could verify the computer program execution environment on the basis of the network communications that were not simulated, and remain unaware that the verified computer program execution environment had been changed to a computer security mechanism. For example, after an attacker verifies that the software container 120 is processing non-simulated network communications, the cyber-security tool 136 changes the software container 120 into the honeypot 120 without the attacker becoming aware of this change.

Since changing a computer program execution environment to a computer security mechanism proactively changes the location of important system resources and the network's configuration, such a change may be considered part of a moving target defense, which increases uncertainty and apparent complexity for attackers, reduces their windows of opportunity, and increases the costs of their probing and attack efforts. Changing a computer program execution environment to a computer security mechanism results in the mapping of the attacked computer system's network topology becoming more complex, and decreases the amount of time that an attacker has to learn the network topology before the network topology is reconfigured by such a change. After a computer program execution environment is changed to a computer security mechanism, anything that an attacker learned about the computer program execution environment may be erroneously attributed to the computer security mechanism.

If the time period for changing a computer program execution environment to a computer security mechanism has not expired since the computer program execution environment began executing the computer program that provides the user service, the cyber-security tool 136 continues checking until the time period for changing the computer program execution environment to the computer security mechanism has expired since the computer program execution environment began executing the computer program that provides the user service. For example, 9 minutes after the software container 120 began executing the database application that enables the clients 102-106 to access data stored in the storage array 110, the cyber-security tool 136 continues checking whether the 10-minute time period for changing the computer program execution environment to the computer security mechanism has passed.

A relatively small time period for changing the computer program execution environment to the computer security mechanism narrows the exposure window of a computer program execution environment to attacks, which increases the attacker's costs in attacking the system that includes the computer program execution environment, and lowers both an attack's likelihood of success and the attacker's perceived benefit from a successful attack. However, a relatively small time period for changing the computer program execution environment to the computer security mechanism can result in high central processing unit usage by the system that includes the computer program execution environment. Therefore, the cyber-security tool 136 may set the time period for changing the computer program execution environment to the computer security mechanism to be a little less than the length of access time required by successful attacks.

The time period for changing the computer program execution environment to the computer security mechanism may be based on any combination of a default time period, a user configured time period, and a time period based on the historical time required for a successful attack. For example, the cyber-security tool 136 initially sets the time period for changing the computer program execution environment to the computer security mechanism to be 10 minutes, which is shorter than the 10.5 minutes historically required for a successful attack. In another example, the cyber-security tool 136 initially sets the time period for changing the computer program execution environment to the computer security mechanism to be generated by a random number generator that uses a normal distribution with a mean of 7 minutes and a standard deviation of 1 minute, such that 99.7% of the random numbers generated will be between 4 minutes and 10 minutes, which is shorter than the 10.5 minutes historically required for a successful attack.

The cyber-security tool 136 can dynamically adjust the time period for changing the computer program execution environment to the computer security mechanism. For example, 9.5 minutes after the software container 120 was deployed, the cyber-security tool 136 identifies abnormal behavior for the software container 120 based on monitoring the parameters for file systems, ports, environment variables, links, mounts, process numbers, thread numbers, memory consumption, central processor unit usage, and input/output usage relative to corresponding historical baseline values. The cyber-security tool 136 identifies abnormal behavior for a monitored parameter when the parameter is higher than a corresponding historical high baseline value or lower than a corresponding historical low baseline value. The cyber-security tool 136 analyzes the association between parameters with abnormal behavior, and uses discretion to determine whether to identify abnormal behavior for a computer program execution environment, and takes appropriate action based on this determination. For example, in response to detecting abnormal behavior 9.5 minutes after the software container 120 was deployed, the cyber-security tool 136 changes the time period for changing the computer program execution environment to the computer security mechanism to 9 minutes, which is shorter than the 9.5 minutes that may be required for a successful attack. The detection of abnormal behavior in the software container 120 can also result in the cyber-security tool 136 immediately changing the software container to the honeypot 120. In another example, in response to detecting abnormal behavior 9.5 minutes after the software container 120 was deployed, the cyber-security tool 136 changes the time period for changing the computer program execution environment to the computer security mechanism to be generated by the random number generator that uses a normal distribution with a mean of 6 minutes and a standard deviation of 1 minute, such that 99.7% of the random numbers generated will be between 3 minutes and 9 minutes, which is shorter than the 9.5 minutes that may be required for a successful attack. The cyber-security tool 136 may use a random number generator to generate the time period for a network identifier so that an attacker will not be able to anticipate the amount of time available before the cyber-security tool 136 begins reconfiguring network topology by changing any computer program execution environments into computer security mechanisms. Although the preceding examples describe similar time periods and similar time period calculations for the time period for changing a network identifier for a computer program execution environment and for the time period for changing a computer program execution environment to a computer security mechanism, the time period for changing a network identifier for a computer program execution environment and for the time period for changing a computer program execution environment to a computer security mechanism may be different time periods and/or based on different time period calculations.

Having changed a computer program execution environment into a computer security mechanism, the system 100 can provide simulated network communications to the computer security mechanism. In embodiments, this can include the cyber-security tool 136 injecting previously recorded network communications into the honeypot 120. Changing a computer program execution environment into a computer security mechanism creates challenges for an attacker, such as frustrating attempts to preserve control from one of the first layer of computer program execution environments that are exposed to the network to deeper layers of computer program execution environments within the computer system. Since the load balancer 118 stops directing data requests from the clients 102-106 to the computer program execution environment that was changed to the computer security mechanism, an attacker who is currently accessing the computer security mechanism may identify the lack of incoming data requests, determine that the attacker is currently accessing a computer security mechanism, discontinue accessing the computer security mechanism, and initiate access with another one of the computer program execution environments. Therefore, after the load balancer 118 stops directing data requests from the clients 102-106 to the computer program execution environment that was changed to the computer security mechanism, the cyber-security tool 136 can inject simulated network communications (known as packet injection), which mimics the network communications that occurred before the computer program execution environment was changed into the computer security mechanism, into the computer security mechanism. The simulated network communications can include data requests from the clients 102-106 and also include communications with other computer program execution environments in the same computer system. The simulated network communications injected into a computer security mechanism that used to be an active computer program execution environment may be based on network communications recorded for the computer program execution environment. The simulated network communication injected into the computer security mechanism can make the computer security mechanism appear to be an actively communicating computer program execution environment from an attacker's perspective. Consequently, an attacker may continue to access a computer security mechanism with injected simulated network communications, which may enable the computer security mechanism to monitor the attacker's action and identify the attacker. The injected simulated network communications can also postpone the attacker from discontinuing access of the computer security mechanism to establish access with one of the other computer program execution environments. The computer security mechanism may identify network communications that were not part of the injected simulated network communications, and analyze these identified network communications to identify an attack and/or an attacker. Injecting simulated network communications into a computer security mechanism disguises the nature of the computer security mechanism from an attacker. Simulated network communications can be the imitated appearance of an information exchange via a system of interrelated things.

After changing a computer program execution environment into a computer security mechanism, the system 100 can create and deploy another computer program execution environment to execute the computer program that provides the user service, thereby replacing the computer program execution environment that was changed into the computer security mechanism. For example, and without limitation, this can include the cyber-security tool 136 copying a master software container to create a new software container (which is not depicted in FIG. 1) and deploying the new software container to replace the software container 120 that was changed to the honeypot 120. Creating a new computer program execution environment from a master computer program execution environment prevents any access or spread of a malicious file that may have corrupted the computer program execution environment that was changed to the computer security mechanism. Additionally, the cyber-security tool 136 can inspect the infrastructure where the new copy of the master computer program execution environment is to be deployed for security issues and for file system aspects, such as malware detection.

After changing a computer program execution environment into a computer security mechanism, the system 100 can determine whether a time period for a computer security mechanism termination has expired since the computer program execution environment was changed into the computer security mechanism. By way of example and without limitation, this can include the cyber-security tool 136 determining whether the 5-minute time period for honeypot termination has passed since the software container 120 was changed to the honeypot 120. If the time period for computer security mechanism termination has expired since the computer program execution environment was changed into the computer security mechanism, the cyber-security tool 136 terminates the computer security mechanism. In embodiments, this can include the cyber-security tool 136 terminating the honeypot 120 to conserve system resources. If the cyber-security tool 136 identifies external network communications to the computer security mechanism, the cyber-security tool 136 may increase the time period for the computer security mechanism's termination, to take an action other than deleting the computer security mechanism, such as enabling the computer security mechanism to continue monitoring the external network communication to identify the attack and/or the attacker. The computer security mechanism may be terminated after the network attacker has had sufficient time to identify the nature of the computer security mechanism, thereby conserving system resources.

If the time period for computer security mechanism termination has not expired since the computer program execution environment was changed to the computer security mechanism, the cyber-security tool 136 continues checking until the time period for computer security termination has expired since the computer program execution environment was changed to the computer security mechanism. For example, 4 minutes after the software container 120 was changed to the honeypot 120, the cyber-security tool 136 continues checking whether the 5-minute time period for terminating the honeypot 120 has passed.

A relatively large time period for terminating the computer security mechanism enlarges the exposure window of an attacker to mistakenly access the computer security mechanism, which at least temporarily redirects subsequent attacks away from the computer program execution environments, which increases the attacker's costs in attacking the system that includes the computer security mechanism, and lowers both an attack's likelihood of success and the attacker's perceived benefit from a successful attack. However, a relatively large time period for terminating the computer security mechanism can consume a significant amount of resources in the system that includes the computer program execution environment. Therefore, the cyber-security tool 136 may set the time period for terminating the computer security mechanism to be a little more than the length of access time spent on computer security mechanisms by attackers.

The time period for terminating the computer security mechanism may be based on any combination of a default time period, a user configured time period, and a time period based on the historical time spent by attacker accessing a computer security mechanism. For example, the cyber-security tool 136 initially sets the time period for terminating a honeypot to be 5 minutes, which is longer than the 4.5 minutes that attackers historically spend accessing honeypots. In another example, the cyber-security tool 136 initially sets the time period for terminating the computer security mechanism to be generated by a random number generator that uses a normal distribution with a mean of 8 minutes and a standard deviation of 1 minute, such that 99.7% of the random numbers generated will be between 5 minutes and 11 minutes, which is longer than the 4.5 minutes that attackers historically spend accessing honeypots.

The cyber-security tool 136 can dynamically adjust time period for terminating the computer security mechanism. For example, 4.5 minutes after the software container 120 was changed to the honeypot 120, the cyber-security tool 136 identifies abnormal behavior for the honeypot 120 based on monitoring the parameters for file systems, ports, environment variables, links, mounts, process numbers, thread numbers, memory consumption, central processor unit usage, and input/output usage relative to corresponding historical baseline values. The cyber-security tool 136 identifies abnormal behavior for a monitored parameter when the parameter is higher than a corresponding historical high baseline value or lower than a corresponding historical low baseline value. The cyber-security tool 136 analyzes the association between parameters with abnormal behavior, and uses discretion to determine whether to identify abnormal behavior for a computer program execution environment, and takes appropriate action based on this determination. For example, in response to detecting abnormal behavior 4.5 minutes after the software container 120 was changed to the honeypot 120, the cyber-security tool 136 changes the time period for terminating the computer security mechanism to 6 minutes, which is longer than the 4.5 minutes that an attacker may have been accessing the honeypot 120. In another example, in response to detecting abnormal behavior 4.5 minutes after the software container 120 was changed to the honeypot 120, the cyber-security tool 136 changes the time period for terminating the computer security mechanism to be generated by the random number generator that uses a normal distribution with a mean of 8 minutes and a standard deviation of 1 minute, such that 99.7% of the random numbers generated will be between 5 minutes and 11 minutes, which is longer than the 4.5 minutes that an attacker may be accessing the honeypot 120. The cyber-security tool 136 may use a random number generator to generate the time period for a network identifier so that an attacker will not be able to anticipate the amount of time available before the cyber-security tool 136 begins terminating what the attacker perceives to be a computer program execution environment.

Figure 2:
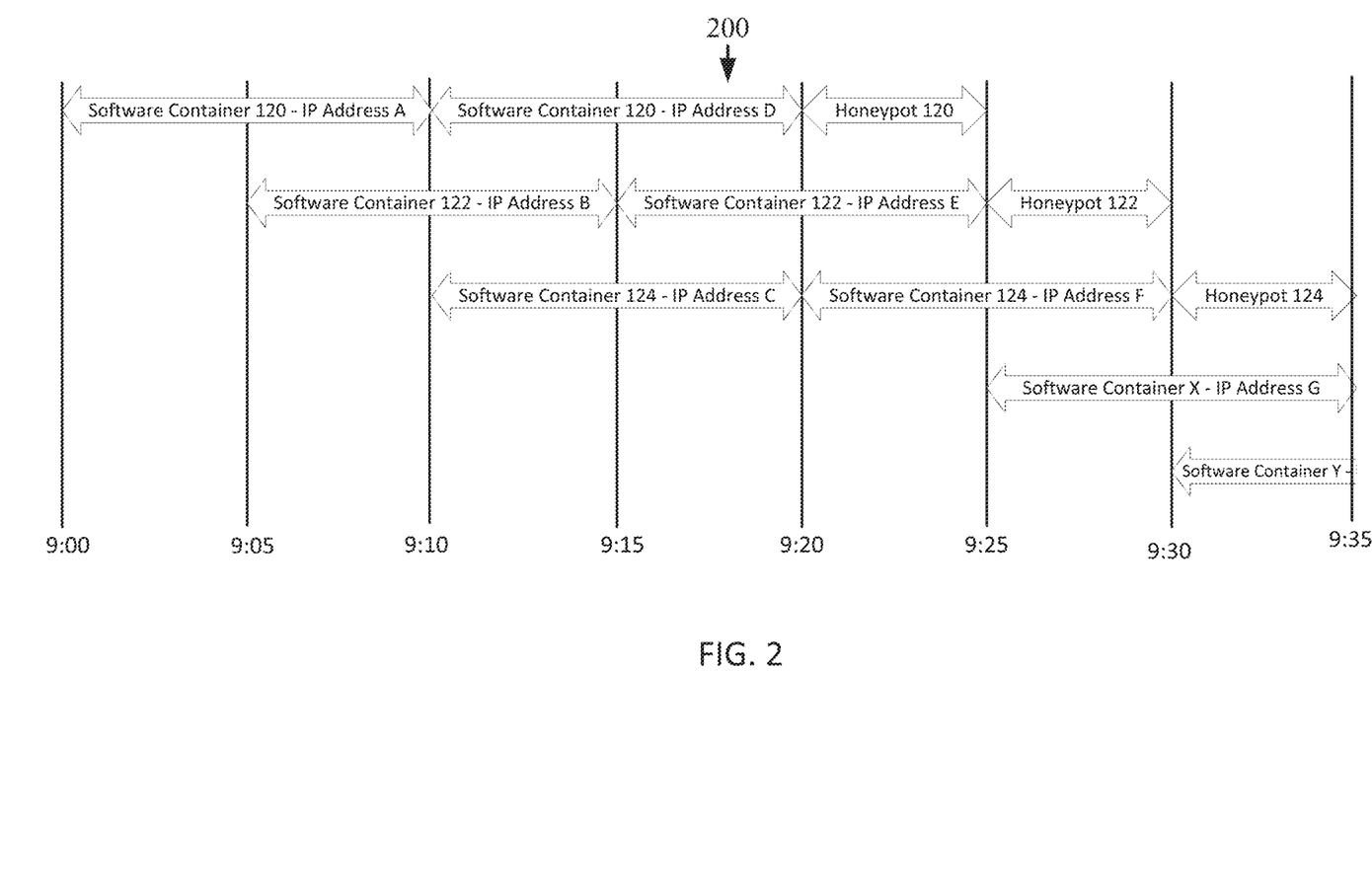
FIG. 2 illustrates an example timeline for dynamic honeypots for computer program execution environments, under an embodiment.

FIG. 2 depicts an example timeline for dynamic honeypots for computer program execution environments, under an embodiment. While timeline 200 begins at 9:00, the system 100 may have already created and deployed software containers, changed network identifiers for software containers, changed software containers into honeypots, and terminated honeypots prior to the timeline 200 beginning at 9:00. Although the timeline 200 depicts 35 minutes of events for three software containers 120-124, the timeline 200 could depict any amount of time of events for any number and any type of computer program execution environments.

At 9:00, the cyber-security tool 136 creates and deploys the software container 120 with the Internet Protocol Address A, and begins periodically checking when to change the Internet Protocol Address A for the software container 120. At 9:05, the cyber-security tool 136 creates and deploys the software container 122 with the Internet Protocol Address B, and begins periodically checking when to change the Internet Protocol Address B for the software container 122. At 9:10, the cyber-security tool 136 creates and deploys the software container 124 with the Internet Protocol Address C, and begins periodically checking when to change the Internet Protocol Address C for the software container 124. Also at 9:10, the cyber-security tool 136 changes the Internet Protocol Address A for the software container 120 to the Internet Protocol Address D for the software container 120. At 9:15, the cyber-security tool 136 changes the Internet Protocol Address B for the software container 122 to the Internet Protocol Address E for the software container 122. At 9:20, the cyber-security tool 136 changes the Internet Protocol Address C for the software container 124 to the Internet Protocol Address F for the software container 124. Also at 9:20, the cyber-security tool 136 changes the software container 120 into the honeypot 120, and begins periodically checking when to terminate the honeypot 120. At 9:25, the cyber-security tool 136 terminates the honeypot 120. Also at 9:25, the cyber-security tool 136 changes the software container 122 into the honeypot 122, and begins periodically checking when to terminate the honeypot 122. Additionally at 9:25, the cyber-security tool 136 creates and deploys the software container X (which is not depicted in FIG. 1) with the Internet Protocol Address G to replace the software container 120 that was changed to the honeypot 120 that was terminated, and begins periodically checking when to change the Internet Protocol Address G for the software container X. At 9:30, the cyber-security tool 136 terminates the honeypot 122. Also at 9:30, the cyber-security tool 136 changes the software container 124 into the honeypot 124, and begins periodically checking when to terminate the honeypot 124. Additionally at 9:30, the cyber-security tool 136 creates and deploys the software container Y (which is not depicted in FIG. 1) with the Internet Protocol Address H to replace the software container 122 that was changed to the honeypot 122 that was terminated, and begins periodically checking when to change the Internet Protocol Address H for the software container Y.

In this manner, the cyber-security tool 136 makes changes for a relatively older computer program execution environment (one that has existed for a relatively long time) prior to making the corresponding changes for a relatively newer computer program execution environment (one that has existed for a relatively short time). While the timeline 200 depicts events occurring based on static time periods (such as 10 minutes to change an Internet Protocol Address, 10 minutes to change a software container to a honeypot, and 5 minutes to terminate a honeypot), the events may occur based on dynamic time periods, which may be random time periods or time periods based on randomly generated numbers, as described above in reference to FIG. 1.

Figure 3:
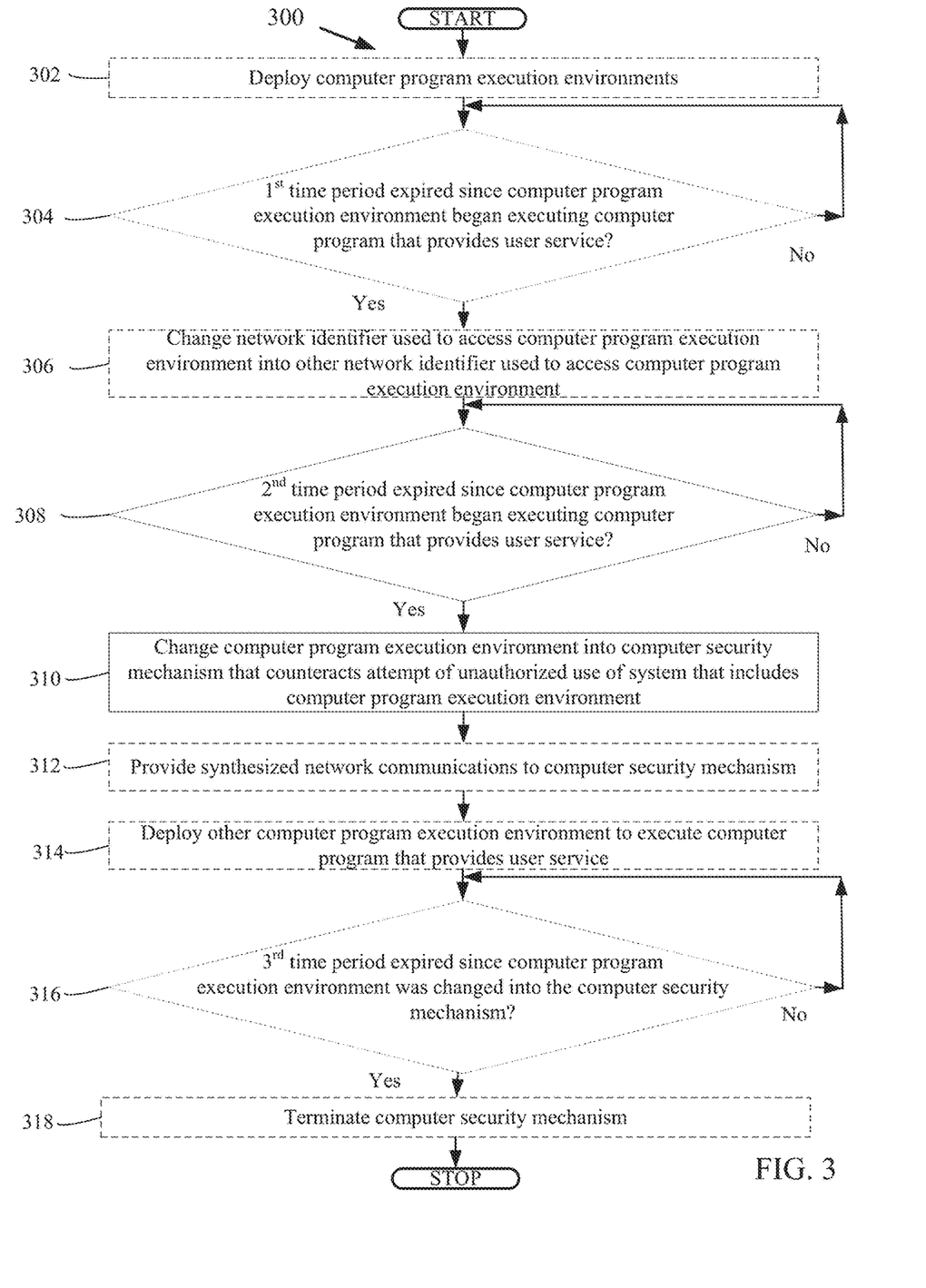
FIG. 3 is a flowchart that illustrates a method for dynamic honeypots for computer program execution environments, under an embodiment.

FIG. 3 is a flowchart that illustrates a method for dynamic honeypots for computer program execution environments, under an embodiment. Flowchart 300 illustrates method acts illustrated as flowchart blocks for certain steps involved in and/or between the clients 102-106 and/or the server 108 of FIG. 1.

Computer program execution environments are optionally deployed, box 302. The system 100 creates environments that execute computer programs which provide user services. For example, and without limitation, this can include the cyber-security tool 136 creating the software containers 120-124 from a master software container, and deploying the software containers 120-124 that each execute a corresponding database application which enables the clients 102-106 to access data stored in the storage array 110.

Having deployed computer program execution environments, a determination is optionally made whether a time period for a network identifier change has expired since one of the computer program execution environments began executing a computer program that provides a user service, box 304. The system 100 determines when to change a network identifier for a computer program execution environment. By way of example and without limitation, this can include the cyber-security tool 136 determining whether a 10-minute period for a network identifier change has passed since the software container 120 began executing the database application that enables the clients 102-106 to access data stored in the storage array 110. If the time period for a network identifier change has expired since the computer program execution environment began executing the computer program that provides the user service, the method 300 continues to block 306 to change a network identifier for the computer program execution environment. If the time period for a network identifier change has not expired since the computer program execution environment began executing the computer program that provides the user service, the method 300 stays at block 304 to continue checking until the time period for a network identifier change has expired since the computer program execution environment began executing the computer program that provides the user service.

If the time period for a network identifier change has expired, a network identifier used to access the computer program execution environment is optionally changed into another network identifier used to access the computer program execution environment, box 306. The system 100 changes a network identifier that is used to access the computer program execution environment to make the mapping of the network topology more difficult for network attackers. In embodiments, this can include the cyber-security tool 136 changing the previous Internet Protocol address for the software container 120 to a new Internet Protocol address for the software container 120.

After deploying computer program execution environments, a determination is made whether a time period to change a computer program execution environment to a computer security mechanism has expired since the computer program execution environment began executing the computer program that provides the user service, box 308. The system 100 determines when to change a computer program execution environment into a computer security mechanism. For example, and without limitation, this can include the cyber-security tool 136 determining whether the 10-minute time period has passed since the software container 120 began executing the database application that enables the clients 102-106 to access data stored in the storage array 110. If the time period to change a computer program execution environment to a computer security mechanism has expired since the computer program execution environment began executing the computer program that provides the user service, the method 300 continues to block 310 to change the computer program execution environment into a computer security mechanism. If the time period to change a computer program execution environment to a computer security mechanism has not expired since the computer program execution environment began executing the computer program that provides the user service, the method 300 stays at block 308 to continue checking until the time period to change a computer program execution environment to a computer security mechanism has expired since the computer program execution environment began executing the computer program that provides the user service.

When the time period to change a computer program execution environment to a computer security mechanism has expired, the computer program execution environment is changed into a computer security mechanism that counteracts an attempt of unauthorized use of the system that includes the computer program execution environment, box 310. The system 100 dynamically changes a computer program execution environment into a computer security mechanism, which makes identification of the computer security mechanism more difficult for an attacker. By way of example and without limitation, this can include the cyber-security tool 136 changing the software container 120 into the honeypot 120.

Having changed a computer program execution environment into a computer security mechanism, simulated network communications are optionally provided to the computer security mechanism, box 312. The system 100 injects fake network communications into a honeypot to disguise the nature of the honeypot from a network attacker. In embodiments, this can include the cyber-security tool 136 injecting previously recorded network communications into the honeypot 120.

After changing a computer program execution environment into a computer security mechanism, another computer program execution environment is optionally deployed to execute the computer program that provides the user service, box 314. The system 100 creates and deploys a new computer program execution environment to replace the computer program execution environment that was changed into the computer security mechanism. For example, and without limitation, this can include the cyber-security tool 136 copying a master software container to create a new software container (which is not depicted in FIG. 1) and deploying the new software container to replace the software container 120 that was changed to the honeypot 120.

After changing a computer program execution environment into a computer security mechanism, a determination is made whether a time period for a computer security mechanism termination has expired since the computer program execution environment was changed into the computer security mechanism, box 316. The system 100 determines when to terminate a computer security mechanism. By way of example and without limitation, this can include the cyber-security tool 136 determining whether the 5-minute time period for honeypot termination has passed since the software container 120 was changed to the honeypot 120. If the time period for a computer security mechanism termination has expired since a computer program execution environment was changed into the computer security mechanism, the method 300 continues to block 318 to terminate the computer security mechanism. If the time period for the computer security mechanism termination has not expired since a computer program execution environment was changed to the computer security mechanism, the method 300 stays at block 306 to continue checking until the time period for the computer security termination has expired since the computer program execution environment was changed to the computer security mechanism.

After determining that the time period for a computer security mechanism termination has expired since a computer program execution environment was changed to the computer security mechanism, the computer security mechanism is optionally terminated, box 318. The system 100 terminates the computer security mechanism after the network attacker has had sufficient time to identify the nature of the computer security mechanism, thereby conserving system resources. In embodiments, this can include the cyber-security tool 136 terminating the honeypot 120 to conserve system resources.

Although FIG. 3 depicts the blocks 302-318 occurring in a specific order, the blocks 302-318 may occur in another order. In other implementations, each of the blocks 302-318 may also be executed in combination with other blocks and/or some blocks may be divided into a different set of blocks.

Figure 4:
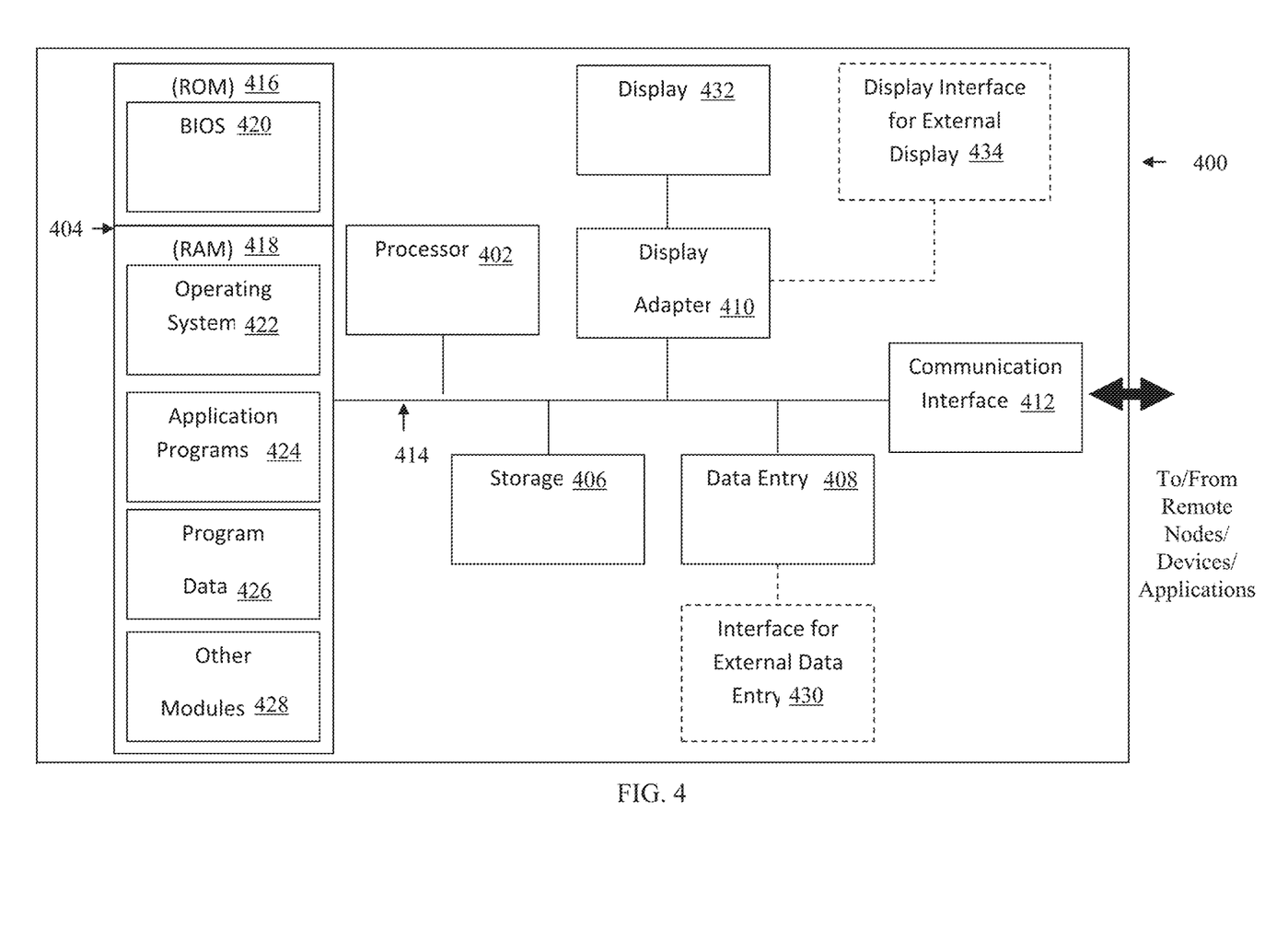
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer-readable medium storing a plurality of instructions, which when executed, will cause the one or more processors to:
   monitor a plurality of computer program execution environments executing computer programs that provide a user service to determine a length of time each individual computer program execution environment has been executing a computer program, at least two of the computer program execution environments having different execution start times;
   determine whether a predetermined time period has expired since a computer program execution environment of the plurality of computer program execution environments began executing a computer program based on the corresponding determined length of time for the computer program execution environment; and
   change the computer execution environment of the plurality of computer program execution environments into a computer security mechanism that counteracts an attempt of unauthorized use of a system that comprises the computer program execution environment in response to a determination that the time period has expired for the computer execution environment.

2. The system of claim 1, wherein the plurality of instructions further cause the processor to deploy the plurality of computer program execution environments.

3. The system of claim 1, wherein the computer program execution environment is one of a software container and a virtual machine.

4. The system of claim 1, wherein the plurality of instructions further cause the processor to:
determine if another time period has expired since the computer program execution environment began executing the computer program that provides the use service; and
change a network identifier used to access the computer program execution environment into another network identifier used to access the computer program execution environment, in response to a determination that the other time period has expired since the computer program execution environment began executing the computer program that provides the user service.

5. The system of claim 1, wherein the plurality of instructions further cause the processor to provide simulated network communications to the computer security mechanism.

6. The system of claim 1, wherein the plurality of instructions further cause the processor to deploy another computer program execution environment to execute the computer program that provides the user service.

7. The system of claim 1, wherein the plurality of instructions further cause the processor to:
determine if an additional time period has expired since the computer program execution environment was changed into the computer security mechanism; and
terminate the computer security mechanism, in response to a determination that the additional time period has expired since the computer program execution environment was changed into the computer security mechanism.

8. A computer-implemented method comprising:
monitoring a plurality of computer program execution environments executing computer programs that provide a user service to determine a length of time each individual computer program execution environment has been executing a computer program, at least two of the computer program execution environments having different execution start times;
determining whether a predetermined time period has expired since a computer program execution environment of the plurality of computer program execution environments began executing a computer program based on the corresponding determined length of time for the computer program execution environment; and
changing the computer execution environment of the plurality of computer program execution environments into a computer security mechanism that counteracts an attempt of unauthorized use of a system that comprises the computer program execution environment in response to a determination that the time period has expired for the computer execution environment.

9. The method of claim 8, wherein the method further comprises deploying the plurality of computer program execution environments.

10. The method of claim 8, wherein the computer program execution environment is one of a software container and a virtual machine.

11. The method of claim 8, wherein the method further comprises:
determining if another time period has expired since the computer program execution environment began executing the computer program that provides the use service; and
changing a network identifier used to access the computer program execution environment into another network identifier used to access the computer program execution environment, in response to a determination that the other time period has expired since the computer program execution environment began executing the computer program that provides the user service.

12. The method of claim 8, wherein the method further comprises providing simulated network communications to the computer security mechanism.

13. The method of claim 8, wherein the method further comprises deploying another computer program execution environment to execute the computer program that provides the user service.

14. The method of claim 8, wherein the method further comprises:
determining if an additional time period has expired since the computer program execution environment was changed into the computer security mechanism; and
terminating the computer security mechanism, in response to a determination that the additional time period has expired since the computer program execution environment was changed into the computer security mechanism.

15. A computer program product, comprising a non-transitory computer-readable medium having a computer-readable program code embodied therein to be executed by one or more processors, the program code including instructions to:
monitor a plurality of computer program execution environments executing computer programs that provide a user service to determine a length of time each individual computer program execution environment has been executing a computer program, at least two of the computer program execution environments having different execution start times;
determine whether a predetermined time period has expired since a computer program execution environment of the plurality of computer program execution environments began executing a computer program based on the corresponding determined length of time for the computer program execution environment; and
change the computer execution environment of the plurality of computer program execution environments into a computer security mechanism that counteracts an attempt of unauthorized use of a system that comprises the computer program execution environment in response to a determination that the time period has expired for the computer execution environment.

16. The computer program product of claim 15, wherein the program code includes further instructions to deploy the plurality of computer program execution environments.

17. The computer program product of claim 15, wherein the computer program execution environment is one of a software container and a virtual machine.

18. The computer program product of claim 15, wherein the program code includes further instructions to:
determine if another time period has expired since the computer program execution environment began executing the computer program that provides the use service; and
change a network identifier used to access the computer program execution environment into another network identifier used to access the computer program execution environment, in response to a determination that the other time period has expired since the computer program execution environment began executing the computer program that provides the user service.

19. The computer program product of claim 15, wherein the program code includes further instructions to:
provide simulated network communications to the computer security mechanism; and
deploy another computer program execution environment to execute the computer program that provides the user service.

20. The computer program product of claim 15, wherein the program code includes further instructions to:
determine if an additional time period has expired since the computer program execution environment was changed into the computer security mechanism; and
terminate the computer security mechanism, in response to a determination that the additional time period has expired since the computer program execution environment was changed into the computer security mechanism.

* * * * *